(12) United States Patent
Cai et al.

(10) Patent No.: US 7,418,010 B2
(45) Date of Patent: Aug. 26, 2008

(54) TRANSMISSION METHOD OF SEVERAL SERVICES COMBINATION

(75) Inventors: Zhaohui Cai, Shenzhen (CN); Zexian Li, Shenzhen (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 1020 days.

(21) Appl. No.: 10/459,580

(22) Filed: Jun. 12, 2003

(65) Prior Publication Data

US 2003/0210712 A1    Nov. 13, 2003

Related U.S. Application Data

(63) Continuation of application No. PCT/CN01/01185, filed on Jul. 19, 2001.

(30) Foreign Application Priority Data

Dec. 14, 2000    (CN) .............................. 00 1 36229

(51) Int. Cl.
*H04J 3/02* (2006.01)
(52) U.S. Cl. .................. 370/498; 370/335; 370/537; 370/441; 370/329; 370/328; 370/431
(58) Field of Classification Search .................. 370/335, 370/441, 329, 328, 431
See application file for complete search history.

(56) References Cited

U.S. PATENT DOCUMENTS

| 5,504,773 | A | 4/1996 | Padovani et al. | ............. 375/200 |
|---|---|---|---|---|
| 6,826,193 | B1 | 11/2004 | Peisa | ........................... 370/437 |
| 6,850,540 | B1 | 2/2005 | Peisa et al. | .................. 370/468 |
| 7,043,244 | B1 | 5/2006 | Fauconnier | ................. 455/442 |
| 7,088,697 | B1 | 8/2006 | Benz et al. | .................. 370/335 |
| 2005/0221849 | A1 | 10/2005 | Van Lieshout et al. | ...... 455/509 |

FOREIGN PATENT DOCUMENTS

| DE | WO 00/35225 | 6/2000 |
|---|---|---|
| EP | 1 006 692 A1 | 6/2000 |
| EP | 1 009 174 A2 | 6/2000 |
| EP | 1006692 | 6/2000 |
| EP | 1009174 | 6/2000 |
| WO | WO/33601 | 6/2000 |
| WO | WO/35225 | 6/2000 |

*Primary Examiner*—Edan Orgad
*Assistant Examiner*—Wutchung Chu
(74) *Attorney, Agent, or Firm*—Bacon & Thomas, PLLC

(57) ABSTRACT

A transmission method of multiple services combination is as follow. During service initialization of both communication sides, an identical TFCS (Transport Format Combination Set), containing all TFC (Transport Format Combination), is created in both sides. When a data is transmitted according to specific TFC at the transmitting end, a corresponding TFCI (Transport Format Combination Indicator) of the TFC is transmitted simultaneously. At the receiving end, the TFCI is used to look for the TFC in the TFCS. The TFCS is divided into no less than one sub-sets according to the specific channel characteristics of the service. TFCI is only used for looking for TFC in a sub-set, but not used to indicate the sub-set where the TFC is located. When data of services are transmitted with TFC at the transmitting end, the service specific channel characteristics are used to define a sub-set where the TFC is located at the receiving end, and the TFCI is used to look for the TFC in the sub-set.

21 Claims, No Drawings

TRANSMISSION METHOD OF SEVERAL SERVICES COMBINATION

This application is a continuation of International Application PCT/CN01/01185, filed Jul. 19, 2001, of which the entire disclosure of the pending, prior application is hereby incorporated by reference.

FIELD OF THE TECHNOLOGY

The invention relates to telecommunication technical field, especially to a transmission method of multiple services combination in a telecommunication system with parallel transport.

BACKGROUND OF THE INVENTION

In modem telecommunication system, transmission method taking time-slot, frame or multiple frames as a unit is popular. In order to transmit data of multiple services simultaneously, it is necessary to combine (to multiplex) data of various services in a certain format at the transmitting end, and to de-multiplex received data of various services with the same format at the receiving end. At transmitting end, combined data and its combination format information are sent simultaneously, and at receiving end, the received data are de-multiplexed according to the received combination format information.

Specially speaking, in present transmission methods of multiple services combination, such as initialization of services between a base station and a mobile, an identical set including all transport formats combination is created at both sides, which is called Transport Format Combination Set (TFCS). When data of services are transported according to certain Transport Format Combination (TFC) at the transmitting end, a Transport Format Combination Indicator (TFCI) is transported simultaneously. The TFC may include multiplex mode, characteristics of the service, such as coding mode, etc. At the receiving end, the TFC of the received data is looked for in the TFCS according to the received TFCI, and then the received data are properly processed based on the TFC.

In order to satisfy requirement of multiple services, TFCI must be updated with certain rate, usually at least once in 10 ms. Therefore, transmission of TFCI occupies a larger part of channel resource. For example, in the TD-SCDMA scheme of CWTS (China Wireless Telecommunication Standard) there are 64 chips for TFCI transmission of each time-slot.

SUMMARY OF THE INVENTION

The invention is to provide a transmission method of multiple services combination, in order to decrease channel resource used by TFCI and increase its update rate.

A transmission method of multiple services combination is that during service initialization of both communication sides, an identical TFCS, containing all TFC, is created in both sides; when a data is transmitted according to a specific TFC at the transmitting end, a corresponding TFCI of the TFC is transmitted simultaneously; at the receiving end, the TFCI is used to indicate the TFC in the TFCS. It is characterized that said TFCS is divided into no less than one sub-sets according to the specific channel characteristics of the service, and the TFCI is only used for looking for TFC in a sub-set, but not used to indicate the sub-set where the TFC is located; when services are transmitted according to the TFC at the transmitting end, at the receiving end the services specific channel characteristics of this time are used to define a sub-set where the TFC is located, and the TFCI is used to look for the TFC in a sub-set.

It is better, the TFCI transmission mode of every sub-set can be identical or different, which can be based on TFCI bits mode, and/or TFCI coding mode, and/or physical time-slot mapping mode of TFCI, and.

It is better, when services are transmitted at the transmitting end according to a TFC of a specific sub-set, the sub-set at the receiving end, where the TFC is located, and the corresponding TFCI transmission mode can be defined according to the service specific channel characteristics of this time.

It is better, said different sub-sets of the TFC can have or cannot have overlap part.

It is better, said specific channel characteristics of a service that is used to divide the TFCS into no less than one sub-set and said specific channel characteristics of a service that is used to define the sub-set, where the TFC is located at the receiving end, can be identical or different, but they essentially define to the same sub-set.

It is better, said specific channel characteristics of a service that is used to divide the TFC set into no less than one sub-set can be number of time-slots, and/or number of channels, and/or spreading factor, and/or data transmission rate.

It is better, said specific channel characteristics of a service that is used to define the sub-set, where the TFC is located, at the receiving end, can be number of timeslots, and/or number of channels, and/or spreading factor, and/or data transmission rate.

The invention divides TFCS into sub-sets. Since number of TFC in a sub-set is less, so number of bits of corresponding TFCI is less. At the receiving end, one or multiple specific channel characteristics, such as number of time-slots, number of channels, spreading factor, data transmission rate etc., can be used to define the subset. In addition, they can be further used to define the bits number of TFCI of the subset. In this way, the TFCI can be correctly received.

The invention can obviously decrease number of bits used to represent TFCI, so channel resource used to transmit TFCI can be saved. Comparing with the present technique, under the same channel resource, the invention obviously decreases number of bits used to represent TFCI, and increases its update rate.

EMBODIMENTS OF THE INVENTION

The invention will be described in more detail, hereinafter, with reference to embodiments. It should be understood that the embodiments are only for description of the invention, which are by no means to limit the invention.

In the present technology, the transmission method of multiple services combination is as follow. At the initialization of a service, an identical TFCS, which includes all TFC, is created at both sides of the communication. When data of services are transmitted according to a specific TFC at the transmitting end, a corresponding TFCI of the TFC is transmitted simultaneously. At the receiving end, the TFC of the received data is looked up in the TFCS with the received TFCI.

For a single service, it is possible there are several formats. For multiple services, the formats combination is possibly much more, so the TFCS is larger. In order to define a TFC in the TFCS, it is needed to have more bits for TFCI, such as 10 to 12 bits. Furthermore, the TFCI must be updated with a certain rate to satisfy various service requirements. Therefore, the transmission of TFCI occupies a bigger part of the channel resource.

For example, in the TD-SCDMA scheme proposed by CWTS, each time-slot has 64 chips for TFCI transmission. Even though, for a service, which occupies fewer time-slots in each sub-frame, the update rate of TFCI is not satisfied, because it can only transmit fewer chips in each sub-frame. For example, suppose a service occupies only one time-slot for every sub-frame, then there are only 64 chips for TFCI in every sub-frame. Suppose the bits number for TFCI is about 12, after coded with Reed-Muller code it is 32 bits. When the spreading factor is 16, it is needed to transmit eight sub-frames to update TFCI once, because every sub-frame can only transmit 64 chips. It is not satisfied that TFCI need to be updated once every 10 ms. If solving this problem by increasing chips number occupied by TFCI in every time-slot, in the situation that there is more time-slots number or lower spreading factor, TFCI will occupy too much resource and channel resource is wasted.

The invention decreases channel resource occupation for transmission of TFCI by decreasing bits number of TFCI. The main idea of the invention is to divide the TFCS into several sub-sets by using specific channel characteristics of services. The specific channel characteristics can be, for example, number of time-slots, spreading factor, number of channels and data transmission rate, etc. Each TFCS sub-set has a corresponding TFCI bits number, and the TFCI bits number for different TFCS subset can be identical or different. Said TFCI bits number is only used for accurately looking for TFC in a TFCS sub-set, and without any indication about which sub-set the TFC belongs to. In this way, the bits number of TFCI can be decreased. In the receiving end, the specific channel characteristics such as number of time-slots, spreading factor, number of channels and data transmission rate, etc., can be used to separate different sub-sets of TFCS. Other channel characteristics can also be used for separating different sub-sets of TFCS, as long as the channel characteristics can define a sub-set division of TFCS same as these specific channel characteristics do.

Data transmission rate of services with various transport formats combination usually varies in a larger scope, for example, the IMT2000 supports that a service can have data transmission rate from several Kbit/s to 2 Mbit/s. In real, by using such as rate matching techniques, data transmission rate in a communication system can be unified to some discrete values, which are easily processed in the physical layer. Therefore, the data transmission rate can be used to divide TFCS into sub-sets. Specifically speaking, data transmission rates of services with TFCs in the TFCS can be sorted from high to low, and the TFCS can be divided into several sub-sets in an appropriate way. For example, taking every sub-set with same number of TFC, so the bits number of TFCI for each sub-set is identical. Consequently, at the receiving end, during initialization, the bits number of a TFCI is known, and the TFC mapping to the TFCI can be known too. In this way, dispensing with the detection for the bits number of a TFCI and TFC mapping to the TFCI in the receiving end, the system design is simplified in a certain degree.

Another example, the data transmission rate can be evenly divided into several sections, and TFC of services in same data transmission rate section belongs to a same sub-set. In this case, the TFC number in a sub-set is related to the transmission rate. In general, a sub-set corresponding to services with lower data transmission rate has less number of TFC, and a sub-set corresponding to services with higher data transmission rate has more number of TFC. This means that a sub-set contain TFC with lower transmission rate has fewer number of bits for TFCI, and a sub-set contain TFC with higher transmission rate has more number of bits for TFCI. This is suitable for the following rule. In every frame (sub-frame), less resource (such as time-slot) is allocated to TFCIs for a sub-set corresponding to services with lower transmission rate, and more resource (such as time-slot) is allocated to TFCIs for a sub-set corresponding to services with higher data transmission rate. It obviously shows that bits number occupied by TFCI is decreased.

In the situations mentioned above, it is possible that the receiving end needs to know the bits number of TFCI, coding mode of TFCI or other information. This can be done by directly judging the specific channel characteristics at receiving end. This also can be done by judging the sub-set through the specific channel characteristics, then determining the bits number or coding mode, etc., of the TFCI corresponding to the sub-set.

Based on the division of sub-sets and corresponding relation between TFC and TFCI in a sub-set, the relevant TFC is obtained. Based on the sub-set type, the obtained TFCI is sent out by selecting appropriate coding algorithm and mapping mode of physical time-slot. A few coding algorithms can be used for TFC. For TFC in a sub-set corresponding to services with lower data transmission rate, the repetition code can be used. The ratio of total chips number of a time-slot to chips number occupied by TFCI in a time-slot is kept unchanged as much as possible. With these considerations, an appropriate time-slot structure is defined to simplify implementation of a system. In a spreading system, to simplify the system design, the spreading method of TFCI can be consistent with the spreading method of service data, or has a fixed spreading factor.

At the receiving end, the sub-set, where the TFC is located, is defined by the specific channel characteristics of the service. The channel characteristics can be number of time-slots, and/or spreading factor, and/or channels number, and/or data transmission rate, etc. This means that the sub-set, where the TFC is located, is determined by one or several channel characteristics. Naturally, channel characteristics (and characteristics used to divide the TFCS into sub-sets) that can be used to determine which sub-set the TFC is located are not limited to the examples listed above. They can be such as numbering of the time-slot, other characteristics or their combination and so on. The only requirement is that the characteristics used essentially define to the same sub-set as the characteristics used for dividing sub-sets do.

In the following, the invention is used in a fixed spreading factor situation.

Since number of time-slots in every frame can decide data transmission rate, number of time-slot for various TFC in a TFCS should be different. Therefore, number of time-slots occupied by the TFC can be used to divide the TFCS into subsets, then a TFCI-TFC index is created according to different sub-sets. Less number of bits is used to represent the TFC occupying less time-slots, and more number of bits is used to represent the TFC occupying more time-slots. With better setting TFCS and configuring TFCI-TFC, every time-slot can use a fixed number of bits (or chips) to represent TFCI.

In the following, an example is used for further description. A connection creates a TFCS, and it is supposed that the total number of the TFCS is N. According to the number of time-slots needed for every frame, there are n1 TFC with one time-slot, n2 TFC with two time-slots and n3 TFC with three time-slots, . . . etc. Suppose every time-slot uses a fixed M chips for TFCI coding, then for one time-slot, the indicating range of TFCI is n1, i.e., M (chips)→n1. For two time-slots, it should be 2×M (chips)→n2, but not M (chips)→N.

In general, less number of time-slots implements less number of TFC. When n1<<N, even blind format detection can be used. For minimum transmission rate of data, only one time-slot is allocated to every sub-frame and spreading factor is 16, then data transmission rate is 8.8 Kb/s. In this case, total number of TFC will be little. Therefore, the resource configuration is more reasonable, the accuracy is easier to guarantee and the update is more rapid.

For a sub-set with less number of time-slots, the repetition code can be used for TFCI coding.

If change of the spreading factor is seen as change of time-slots number, it is enough to spread the method mentioned above to the situation that has a changing spreading factor.

Along with changing of the spreading factor, the transmitted data are changed. Therefore, if the number of chips for TFCI is fixed and spreading mode of TFCI is same as spreading mode of data, the relative value of data rate and bits number of TFCI are unchanged. The method mentioned above also can be used.

In summary, it can be done as follow. The TFCI spreading mode applies the same method as data spreading to simplify the system. Number of chips occupied by TFCI in every time-slot structure is fixed. The corresponding relation of TFCI and TFC is defined according to number of time-slots and spreading factor, i.e., the TFCS is divided into sub-sets according to number of time-slots and spreading factor. When a system sets TFCS according to the service type, the procedure mentioned above can be considered to simplify dividing TFCS into sub-sets and creating corresponding relation between TFC and TFCI.

The invention claimed is:

1. A transmission method of multiple services combination, comprising the steps of:
   during services initialization of communication, creating an identical transport format combination set (TFCS) which contains all transport format combinations (TFCs) at both a transmitting end and a receiving end;
   dividing the TFCS into no less than one sub-sets according to a first specific channel characteristics of multiple services combination, and using a transport format combination indicator (TFCI) to indicate the TFCs in the sub-set;
   transmitting, by the transmitting end, the multiple services combination according to a specific TFC in one sub-set, and transmitting the corresponding TFCI of the TFC simultaneously;
   determining, by the receiving end, the sub-set where the TFC is located according to a second specific channel characteristics of the multiple services combination, looking for the TFC in the sub-set according to the TFCI, and receiving the multiple services combination according to the TFC.

2. The transmission method according to claim 1, further comprising:
   determining a transmission mode of the TFCI according to the second specific channel characteristics.

3. The transmission method according to claim 2, wherein the transmission mode of the TFCI comprises at least one of: number of the bits of the TFCI, coding mode of the TFCI, and physical slot mapping mode of the TFCI.

4. The transmission method according to claim 1, wherein different sub-sets of the TFCS have an overlap part or do not have an overlap part.

5. The transmission method according to claim 1, wherein the first specific channel characteristics and the second specific channel characteristics of services are identical or different, but they essentially define a same sub-set.

6. The transmission method according to claim 1, wherein the first specific channel characteristics comprises at least one of: number of time-slots, number of channels, spreading factor, and data transmission rate.

7. The transmission method according to claim 1, wherein the second specific channel characteristics comprises at least one of: number of time-slots, number of channels, spreading factor, and data transmission rate.

8. The transmission method according to claim 1, further comprising:
   after determining the sub-set where the TFC is located, determining, by the receiving end, a transmission mode of the TFCI according to the sub-set.

9. The transmission method according to claim 1, wherein the first specific channel characteristic of the multiple services combination is a transmission rate of the multiple services combination; and
   the step of dividing the TFCS into no less than one sub-set according to a first specific channel characteristic of the multiple services combination comprises:
   sorting the TFCs in the TFCS according to the transmission rate;
   dividing the same number of TFCs which are sorted in successive into each sub-set.

10. The method according to claim 1, wherein the first specific channel characteristic of the multiple services combination is a transmission rate of the multiple services combination; and
    the step of dividing the TFCS into no less than one sub-set according to a first specific channel characteristic of the multiple services combination comprises:
    dividing the TFCs corresponding to the same transmission rate into one sub-set.

11. A transmission method of multiple services combination, comprising the steps of:
    during services initialization of communication, creating a transport format combination set (TFCS) containing all transport format combinations (TFCs) at a transmitting end;
    dividing the TFCS into no less than one sub-set according to a specific channel characteristic of multiple services combination at the transmitting end, and using a transport format combination indicator (TFCI) to indicate the TFCs in the sub-set;
    transmitting, by the transmitting end, to a receiving end the multiple services combination according to a TFC in one sub-set, and transmitting the corresponding TFCI of the TFC;
    wherein the receiving end is configured with a TFCS identical to the TFCS at the transmitting end and the TFCS at the receiving end is divided into no less than one sub-set identical with the transmitting end.

12. The transmission method according to claim 11, wherein the specific channel characteristic comprises at least one of: number of time-slots, number of channels, spreading factor, and data transmission rate.

13. The transmission method according to claim 11, wherein the specific channel characteristic of the multiple services combination is a transmission rate of the multiple services combination; and
    the step of dividing the TFCS into no less than one sub-set according to a specific channel characteristic of the multiple services combination comprises:
    sorting the TFCs in the TFCS according to the transmission rate;

dividing the same number of TFCs which are sorted in successive into each sub-set.

14. The transmission method according to claim 11, wherein the specific channel characteristic of the multiple services combination is a transmission rate of the multiple services combination; and the step of dividing the TFCS into no less than one sub-set according to a specific channel characteristic of the multiple services combination comprises:

dividing the TFCs corresponding to the same transmission rate into one sub-set.

15. A method for receiving multiple services combination, comprising the steps of:

determining, by a receiving end, a sub-set where a transport format combination (TFC) is located according to a second specific channel characteristic of multiple services combination from a transmitting end;

determining, by the receiving end, the TFC in the sub-set according to a transport format combination indicator (TFCI) received from the transmitting end; and receiving, by the receiving end, the multiple services combination according to the TFC, wherein during services initialization of communication, a transport format combination set (TFCS) which contains all transport format combinations (TFCs) is created at both a transmitting end and the receiving end; no less than one sub-set is divided from the TFCS at the transmitting end according to a first specific channel characteristic of multiple services combination; the TFCS at the receiving end is divided into no less than one sub-set identical with the transmitting end; and the TFCs in the sub-set are indicated by a transport format combination indicator (TFCI); and the multiple services combination is transmitted to the receiving end by the transmitting end according to a TFC in one sub-set and the corresponding TFCI of the TFC is transmitted.

16. The method according to claim 15, further comprising:

determining, by the receiving end, a transmission mode of the TFCI according to the second specific channel characteristic.

17. The method according to claim 15, further comprising:

after determining the sub-set where the TFC is located, determining, by the receiving end, a transmission mode of the TFCI according to the sub-set.

18. The method according to claim 15, wherein the transmission mode of the TFCI comprises at least one of: number of the bits of the TFCI, coding mode of the TFCI, and physical slot mapping mode of the TFCI.

19. The method according to claim 15, wherein the second specific channel characteristic comprises at least one of: number of time-slots, number of channels, spreading factor and data transmission rate.

20. The method according to claim 15, wherein the first specific channel characteristic of the multiple services combination is a transmission rate of the multiple services combination; and the step of dividing the TFCS into no less than one sub-set according to the first specific channel characteristic of the multiple services combination comprises:

sorting the TFCs in the TFCS according to the transmission rate;

dividing the same number of TFCs which are sorted in successive into each sub-set.

21. The method according to claim 15, wherein the first specific channel characteristic of the multiple services combination is a transmission rate of the multiple services combination; and the step of dividing the TFCS into no less than one sub-set according to the first specific channel characteristic of the multiple services combination comprises:

dividing the TFCs corresponding to the same transmission rate into one sub-set.

* * * * *